Dec. 13, 1938.  B. H. LOMNES  2,140,054
BINDER PLATFORM
Filed March 25, 1937

Inventor
Bert H. Lomnes
by Frederick E. Bromley
ATTY.

Patented Dec. 13, 1938

2,140,054

UNITED STATES PATENT OFFICE 2,140,054

BINDER PLATFORM

Bert H. Lomnes, Armena, Alberta, Canada

Application March 25, 1937, Serial No. 132,889
In Canada May 11, 1936

3 Claims. (Cl. 56—181)

The invention relates to binders and has for its object to provide a cutting platform that may be extended for cutting a swath of increased width.

According to the present invention the cutting platform is composed of a frame having extension members whereby a one-foot or two-foot cutting bar can be inserted in order to convert a six-foot platform into a seven or eight foot platform. The invention enables an increased cutting swath to be obtained without having to resort to the use of additional cutting platforms.

The invention furnishes a serviceable extensile platform that is economical to manufacture and readily adjustable as to its cutting length.

Referring to the accompanying drawing.

Like numerals of reference indicate corresponding parts in each of the figures throughout the drawing of the invention.

Figure 1:
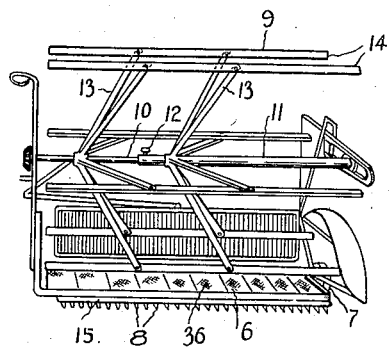
Figure 1 is a general view of the binder platform and reel.

In the drawing, the reference numeral 6 generally denotes the cutting platform which extends from the gear frame of the binder and is supported at its outer end by the grain wheel 7, as usual. The forward edge of the platform carries the fingers, denoted at 8 in Figure 1, which co-operate with the knife in the cutting of the grain.

The reel is denoted at 9 and has an extensile shaft composed of telescopic parts 10 and 11 in order that its length may be adjusted to accord with the adjustment of the platform. The two parts are secured together by a set screw as at 12, and each part carries a set of arms 13 for the blades 14. By this construction, the reel can be elongated by detaching the blades and extending the telescopic shaft, then attaching a longer set of blades according to the increased length of the cutting platform.

The extensile cutting platform comprises a front member 15 and a rear member 16 rigidly joined to and carried by the gear casing. These members form part of the platform frame. The front member constitutes a part of the cutting bar or finger bar and extends the greater length thereof. It is preferably of substantially a Z-shaped cross section, of which the bottom flange 17 carries the fingers 18.

The front member is supplemented by an extension member 19 which forms a continuation thereof and has a section 20 of a similar shape to carry the rest of the fingers. This extension member has its bottom flange cut away as at 21 in order to leave an L-shaped section 22 that fits against the front member 15 and is secured to it by bolts placed in the holes 23.

The rear member 16 is supplemented by an extension member 24 bolted to it as at 25 and continued outwardly into an end piece 26. The end piece carries the grain wheel 7 and is integral with or secured to the extension member 19.

Figure 2:
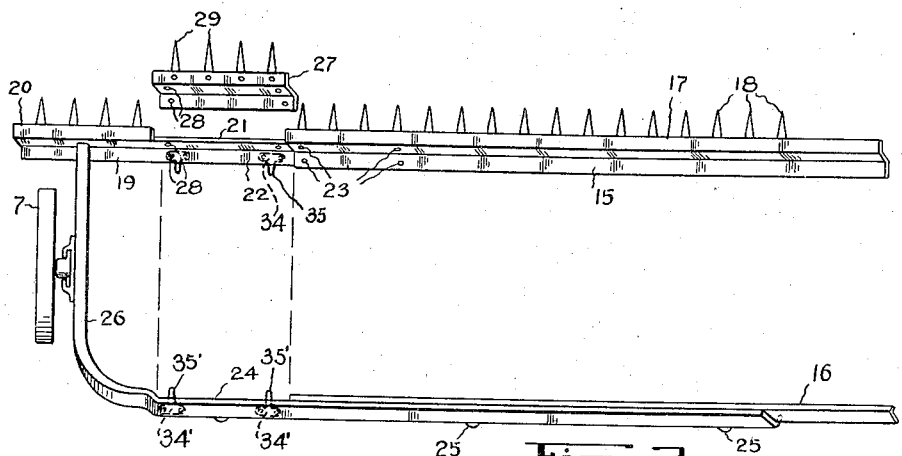
Figure 2 is a plan view of the underside of the platform extended a foot and showing the extension cutting-bar detached.

It will be manifest that by this construction the frame can be extended as shown in Figure 2 so as to convert it into a longer platform. However, when so extended it is necessary to insert a cutting-bar extension piece to fill in the gap left by the spreading of the front member 15 and the extension member 19. When the frame is extended a foot, the cutting-bar extension 27 is inserted and secured to the section 22 by bolts lodged in the holes 28. The cutting-bar extension carries complemental fingers 29.

Figure 3:
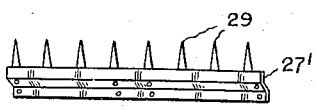
Figure 3 is a perspective view of the extension cutting-bar for a two-foot extension.

To extend the frame a couple of feet it is necessary to use the cutting-bar extension 27' shown in Figure 3, which is of a greater length, but otherwise the same. It will be understood of course that when the cutting bar is extended, a longer knife must be used, and also that the canvas must be extended accordingly.

Figure 4:
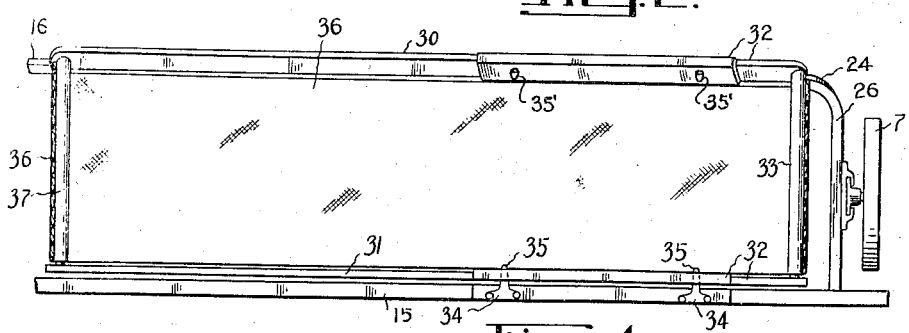
Figure 4 is a top plan view of the platform with the canvas extended with the frame.
Figure 5:
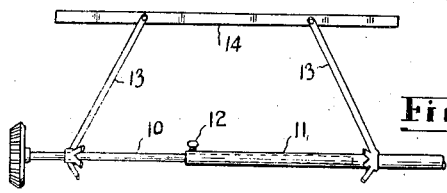
Figure 5 is a detail view showing the manner of extending the reel shaft to accommodate the extension of the platform.

Figure 4, in conjunction with Figure 2, is illustrative of the construction employed to extend the canvas, and is given by way of illustration but not of limitation. The sills 30 and 31 are supplied with guide extensions 32 at the outer end of the frame in order to carry the outer roller 33. The guide extension at the front of the platform is secured by brackets 34 bolted or otherwise fastened on the cutting-bar extension member 19. The brackets have prongs 35 inserted in holes in the guide extension to effect a detachable connection. The guide extension at the rear of the platform is likewise secured by brackets 34' detachably mounted on the extension member 24 by bolts or the like and similarly provided with prongs 35' lodged in holes in the rear guide extension to effect a detachable connection. The canvas 36 is stretched from the inner roller 37 to the outer roller 33, consequently when the distance between the rollers is changed by adjustment of the frame, it is necessary to use a canvas of a different length. It will be evident that other means may be resorted to for adjusting the outer roller without departing from the spirit and scope of the invention.

From the preceding description it will be manifest that this invention provides an extensile platform that can be readily converted for cutting a wider swath.

What I claim is:

1. A cutting platform for a binder having a gear frame, said platform, comprising longitudinal members so detachably connected as to produce an extensile frame, said frame, including a cutting bar composed of a finger-carrying member for attachment to the gear frame, a supplemental finger-carrying member in alignment therewith and having a reduced part overlapping said finger-carrying member, means for detachably connecting said reduced part to said finger-carrying member so as to secure said supplemental finger-carrying member in end to end relation therewith or in spaced relation thereto, an extension piece having supplemental fingers and adapted to be fitted between the finger-carrying members when in spaced relation, and fastening elements for securing said extension piece to the reduced part of said supplemental finger-carrying member.

2. In a binder platform, the combination of a flanged front member constituting a part of a cutting-bar and having a bottom flange, fingers carried by said flange, a rear member co-extensive with said front member in spaced relation, said front and rear members being adapted to be supported at the inner end of the platform, a flanged extension member supplementary to the said front member and forming a continuation thereof with its inner end overlapping the outer end thereof, said extension member having a bottom flange spaced from the bottom flange of the front member leaving a gap, fingers carried by the bottom flange of the extension member, means detachably securing the extension member to the front member, a cutting-bar extension detachably secured to the extension member and having a bottom flange filling the gap aforesaid, fingers carried by said flange of the cutting-bar extension, and a rear extension member detachably secured to the aforesaid rear member and united to the said extension member that forms a part of the cutting-bar.

3. In a binder platform, the combination of a flanged front member constituting a part of a cutting-bar and having a bottom flange, fingers carried by said flange, a rear member co-extensive with said front member in spaced relation, said front and rear members being adapted to be supported at the inner end of the platform, a flanged extension member supplementary to the said front member and forming a continuation thereof with its inner end overlapping the outer end thereof, said extension member having a bottom flange spaced from the bottom flange of the front member leaving a gap, fingers carried by the bottom flange of the extension member, means detachably securing the extension member to the front member, a cutting-bar extension detachably secured to the extension member and having a bottom flange filling the gap aforesaid, fingers carried by said flange of the cutting-bar extension, a rear extension member overlapping and bolted to the aforesaid rear member and outwardly continued therefrom into an end piece that is rigidly united with the said extension member that forms a part of the aforesaid cutting-bar, and a grain wheel carried by said end piece.

BERT H. LOMNES.